United States Patent
Branson et al.

(10) Patent No.: US 6,175,876 B1
(45) Date of Patent: Jan. 16, 2001

(54) MECHANISM FOR ROUTING ASYNCHRONOUS STATE CHANGES IN A 3-TIER APPLICATION

(75) Inventors: Michael J. Branson; Steven G. Halverson; Andrew J. Streit; Devaughn L. Rackham; Susette M. Townsend, all of Rochester, MN (US)

(73) Assignee: International Business Machines Corporation, Armonk, NY (US)

( * ) Notice: Under 35 U.S.C. 154(b), the term of this patent shall be extended for 0 days.

(21) Appl. No.: 09/112,353

(22) Filed: Jul. 9, 1998

(51) Int. Cl.[7] ................................................. G06F 17/30
(52) U.S. Cl. ........................... 709/252; 709/251; 714/15; 714/49; 707/103
(58) Field of Search ........................... 707/103; 709/251, 709/252; 714/15, 49

(56) References Cited

U.S. PATENT DOCUMENTS

| | | | |
|---|---|---|---|
| 4,972,367 | * | 11/1990 | Burke ..................................... 707/10 |
| 5,220,563 | * | 6/1993 | Grenot et al. ......................... 370/396 |
| 5,819,019 | * | 10/1998 | Nelson .................................... 714/4 |
| 5,898,834 | * | 4/1999 | Sharpe et al. ......................... 709/201 |
| 6,018,805 | * | 1/2000 | Ma et al. ................................ 714/4 |
| 6,052,722 | * | 4/2000 | Taghadoss ........................... 709/223 |

OTHER PUBLICATIONS

Branson, et al., U.S. Patent application Ser. No. 09/112,352, filed Jul. 9, 1998.

* cited by examiner

Primary Examiner—Thomas G. Black
Assistant Examiner—William Trinh
(74) Attorney, Agent, or Firm—Christopher H. Lynt

(57) ABSTRACT

Routing asynchronous state changes in a multi-processing system having an end user system, a central application server system and an endpoint system, includes detecting a state change with a service object on the endpoint system, sending a notification to an associated service proxy object on the central application server system notifying the associated service proxy object of the state change, sending a notification to an associated distributed service object which is an owner of the service proxy notifying the associated distributed service object of the state change, sending a notification to an associated distributed service proxy object on the end user system notifying the associated distributed service proxy object of the state change, and posting an event to an associated owner window of the distributed service proxy object using a window identifier including sending a notification to the associated owner window notifying the associated owner window of the state change.

23 Claims, 3 Drawing Sheets

MECHANISM FOR ROUTING ASYNCHRONOUS STATE CHANGES IN A 3-TIER APPLICATION

CROSS-REFERENCE TO RELATED APPLICATIONS

This application is related to the applicants' copending application Ser. No. 09/112,532 filed Jul. 9, 1998, entitled "AUTOMATIC NOTIFICATION OF SYSTEM FAILURE IN A NETWORK APPLICATION,"

BACKGROUND OF THE INVENTION

1. Field of the Invention

The invention relates to the field of multi-processing systems in an asynchronous processing environment, for example, computer networks, and in particular, to providing notification to affected end users about state changes in relevant service objects distributed in the network.

2. Background Information

Multi-processing systems are known, such as computer networks, and application programs may utilize resources which are distributed among the systems, e.g., a database located on a remote computer on the network may be accessed by an application program started by an end user interface on a network/personal computer (PC). Such an application program is referred to herein generically as a network application and PC is used for both network and personal computers.

It is generally desirable in a program with an end user interface to display the most up to date state of the data or entities that the end user is concerned with. If an end user performs an operation that resulted in a state change in data or an entity (from here on data, data or other entities will just be referred to as data) it is fairly straight forward to update the end user interface because the program knows that it changed the data and it knows that the user who caused the data to change is interested in that data. Other end users who are viewing the same data also need to have their views updated. This is a more complex problem, but it has generally been solved by data objects keeping track of the views that are interested in them so that they can notify the views when the data changes. Views register themselves with the data that they are interested in and unregister when they are deleted or no longer interested. This technique is known by many names such as the Observer design pattern or Model-View-Controller (MVC).

Using the observer pattern on a single system or in a client server is reasonably straight forward, but solving the problem of keeping the end user interface up to date in a 3-tier application is much more difficult. A 3-tier application that uses asynchronous communications between the 2nd and 3rd tier presents a different and much more complex problem. An exemplary 3-tier network application environment consists of the following 3-tiers.

On tier one, there is an end user interface on a PC. On tier two, there is a central application server associated with the end user that drives the majority of the application logic. On tier three, there are other systems that the application server deals with to perform distributed operations, called endpoints systems in this 3 tier model.

Asynchronous communication between the 2nd and 3rd tiers allows for the central application server to issue requests to the tier 3-systems in parallel. If the end user operation is to perform a task on 100 tier 3 systems, for example, it is not desirable for the central application server to perform these tasks in a synchronous fashion. If they were performed synchronously, the task could not be started on the 2nd system until it was completed on the 1st system, and it could not be started on the 3rd system until it was completed on the 2nd system, and so on.

Therefore, there is a need to solve the problem of keeping the end user interface up to date in a 3-tier application where the 2nd and 3rd tier, for example, communicate asynchronously.

SUMMARY OF THE INVENTION

It is, therefore, a principal object of this invention to provide a method for routing asynchronous state changes in a multi-processing environment.

It is another object of the invention to provide a method that solves the above mentioned problems so that an end user interface of an application can display the most up to date information.

These and other objects of the present invention are accomplished by the method disclosed herein.

According to an aspect of the invention, when a user action requires an operation to be performed in the network, a type of distributed service object is created on the central application server, and a proxy object is created on the PC where the end user requested the action. The distributed service object on the central application server knows the routing information to communicate with its proxy on the PC, and likewise, the proxy knows the routing information to the object on the central application server.

The distributed service object on the central application server will create some type of endpoint service object on each endpoint system that it needs to communicate with to accomplish the user's operation, and a proxy object is created on the central application server for every endpoint service object that was created. The endpoint service object knows the routing information necessary to communicate with its proxy on the central application server, and likewise, the proxy knows the routing information to the object on the endpoint system.

In both of the above cases, the proxy objects are interested in the service object that they are associated with. When those service objects change, they notify their proxy of the change, routing their messages using the routing information that they store about the location of their proxy.

This arrangement provides a notification path between a service object on an endpoint system (tier 3) and its proxy on the central application server (tier 2), and a notification path between a distributed service object on the central application server (tier 2) and its proxy on the PC (tier 1).

According to another aspect of the invention, two more levels of notification that are provided. In particular, a notification path between the endpoint's proxy object on the central application server and the distributed service object on the central application server, and between the distributed service object's proxy on the PC and the window in which the user is viewing the data.

According to another aspect of the invention, these other levels of notification are enabled by generalizing the concept of an owner of a service object proxy. The owner of the endpoint service object proxy on the central application server is registered to be the distributed service object on the central application server. The owner of the distributed service object proxy on the PC is registered to be the window ID of the window where the data is displayed.

According to another aspect of the invention, through these four levels of notification, a state change of data on an endpoint system is relayed to the end user interface on the PC.

According to another aspect of the invention, the endpoint service object detects the change in data (because it caused the change) and it notifies its proxy object on the central application server.

According to another aspect of the invention, the endpoint service object's proxy on the central server notifies its owner (the distributed service object on the central server) of the data change.

According to another aspect of the invention, the distributed service object on the central server notifies its proxy object on the PC of the data change.

According to another aspect of the invention, the distributed service object's proxy on the PC posts an event to its owner, e.g., a window or windows using window identification (ID).

These and other aspects of the invention will become apparent from the detailed description set forth below.

DETAILED DESCRIPTION OF THE PREFERRED EMBODIMENTS

The invention will now be described in more detail by way of example with reference to the embodiments shown in the accompanying figures. It should be kept in mind that the following described embodiments are only presented by way of example and should not be construed as limiting the inventive concept to any particular physical configuration.

The invention will be described in the context of a three-tiered network environment, however, the invention is not necessarily limited thereto. In a classical three-tiered network, there is a presentation logic (PL) tier, a business logic (BL) tier, and a data logic (DL) tier. The presentation logic tier, tier one, is the so-called front end of the application. This is the graphical user interface (GUI) that collects data from the user and displays information for the user. Its purpose is to interact with the end user and to request services from one or more servers and/or host systems.

The business logic tier, tier two, is usually running on a server. It processes data on behalf of the PL client and may require the services of other BL's residing on the same or other machines.

The data logic tier, tier three, is usually a host program which obtains data requested by either a BL or PL from a database.

Figure 1:
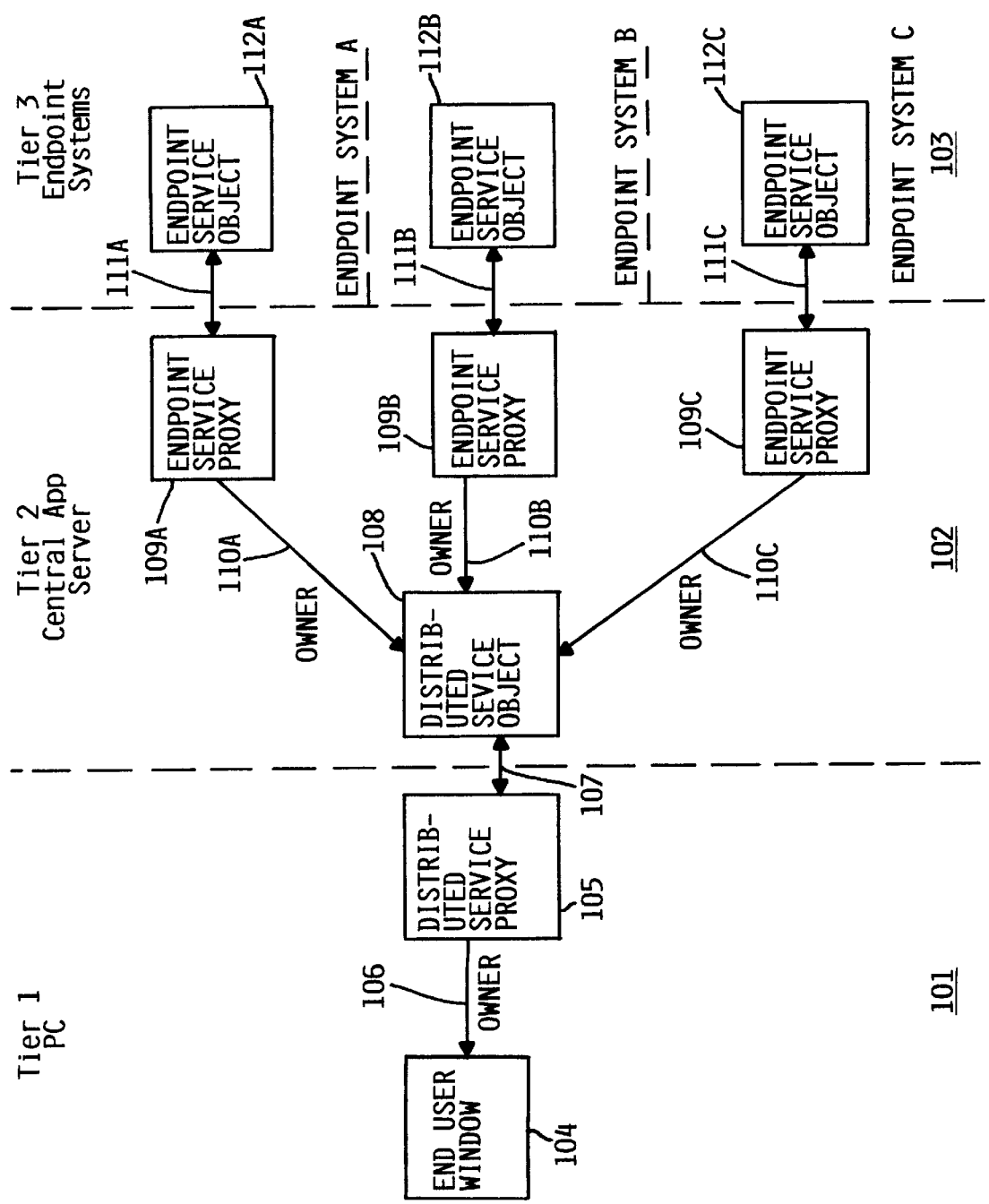
FIG. 1 illustrates a three-tier network application environment according to an exemplary embodiment of the present invention.

The network application environment illustrated in FIG. 1 has 3 tiers 101, 102 and 103. The first tier labeled TIER ONE 101, is the presentation logic (PL) tier, and represents an end user interface on a network/personal computer (PC), for example. End user window 104 is connected to distributed service proxy 105 by owner line 106. Distributed service proxy 105 is connected to a distributed service object 108 in the second tier 102 by line 107.

The second tier labeled TIER TWO 102, is the business logic (BL) tier, and represents a central application server associated with the end user that drives the majority of the application logic. However, there could be more than one server, as explained above. The first tier distributed service proxy 105 is connected to a distributed service object 108 in the second tier 102 by line 107.

The third tier labeled TIER THREE 103, is the data logic (DL) tier, and represents other systems, called endpoint systems, that the central application server of the second tier 102 deals with to perform distributed operations. Three endpoint systems (Systems A, B and C) are illustrated for the purposes of explanation, it being understood that there could be any number.

Distributed service object 108 is connected to three endpoint service proxies 109A, 109B and 109C by respective owner lines 110A, 110B and 110C. While three endpoint service proxies are illustrated, this is only for purposes of explanation, it being understood that there could be any number of endpoint service proxies in actuality. Each endpoint service proxy 109A, 109B and 109C, is connected to an endpoint service object 112A, 112B and 112C, in the third tier 103 by a respective line 111A, 111B and 111C.

End user operations result in some number of request and reply messages being sent between system in the 3-tier environment. Messages are sent in packets, and each packet contains routing information. Some packets contain routing information that tells them where to go, and others also contain routing information that identifies where they came from, so that messages can be sent in response. The routing information in a packet may include the system ID and an object ID.

All operations in the network application utilize service objects, e.g., 112A, 112B and 112C, and their corresponding proxies, e.g., 109A, 109B and 109C, that exist on the systems involved in the operation. A "service object" is a bundle of data and function for performing a particular service.

When a user action requires an operation to be performed in the network, a type of distributed service object 108 is created on the central application server of tier two 102, and a proxy object 105 is created on the PC of tier one 101 where the end user requested the action. The distributed service object 108 on the central application server of tier two 102 knows the routing information to communicate with its proxy 105 on the PC of tier one 101, and likewise, the proxy 105 knows the routing information to the object 108 on the central application server of tier two 102.

The distributed service object 105 on the central application server of tier two 102 will create some type of endpoint service object 112A, 112B, 112C on each endpoint system (A, B and C) of tier three 103 that it needs to communicate with to accomplish the user's operation, and a proxy object 109A, 109B, 109C is created on the central application server of tier two 102 for every endpoint service object 112A, 112B, 112C that was created. The endpoint service object 112A, 112B, 112C knows the routing information necessary to communicate with its proxy 109A, 109B, 109C on the central application server of tier two 102, and likewise, the proxy 109A, 109B, 109C knows the routing information to the object 112A, 112B, 112C on the endpoint system of tier three 103.

In both of the above cases, the proxy objects are interested in the service object with which they are associated. When those service objects change, they notify their proxy of the change, routing their messages using the routing information that they store about the location of their proxy.

This arrangement provides a notification path between a service object on an endpoint system of tier three 103 and its proxy on the central application server of tier two 102, and a notification path between a distributed service object on the central application server of tier two 102 and its proxy on the PC of tier one 101.

However, there are two more levels of notification that are needed. In particular, it is needed to enable a notification path between the endpoint's proxy object, e.g., 109A, on the central application server of tier two 102 and the distributed service object 108 on the central application server of tier two 102, and also between the distributed service object's proxy 105 on the PC of tier one 101 and the window 104 in which the user is viewing the data.

These other levels of notification are enabled by generalizing the concept of an owner of a service object proxy. The owner of the endpoint service object proxy, e.g., 109A, on the central application server of tier two 102 is registered to be the distributed service object 108 on the central application server of tier two 102. The owner of the distributed service object proxy 105 on the PC of tier one 101 is registered to be the window ID of the window 104 where the data is displayed.

Through these four levels of notification/ownership, a state change of data on an endpoint system of tier three 103 is relayed to the end user interface on the PC of tier one 101 as will now be described.

The endpoint service object, e.g., 112C, detects the change in data (because it caused the change) and it notifies its proxy object, e.g., 109C, on the central application server of tier two 102. The endpoint service object's proxy 109C on the central server notifies its owner, i.e., the distributed service object 108 on the central server, of the data change. The distributed service object 108 on the central server of tier two 102 in turn notifies its proxy object 105 on the PC on tier one 101 of the data change. The distributed service object's proxy 105 on the PC posts an event to its owner, i.e., an end user window 104, using its window ID.

The window 104 that the end user is viewing the data in now knows of the data change. The window 104 can furthermore update its view using data passed back in the notification.

It should be noted that there may be more than one user who is viewing the same data, e.g., on another PC. However, the solution according to the invention allows for this. At any of the four above described levels of notification, more than one object may be notified, e.g., any service object may have more than one proxy, or any proxy may have more than one owner.

Figure 2:
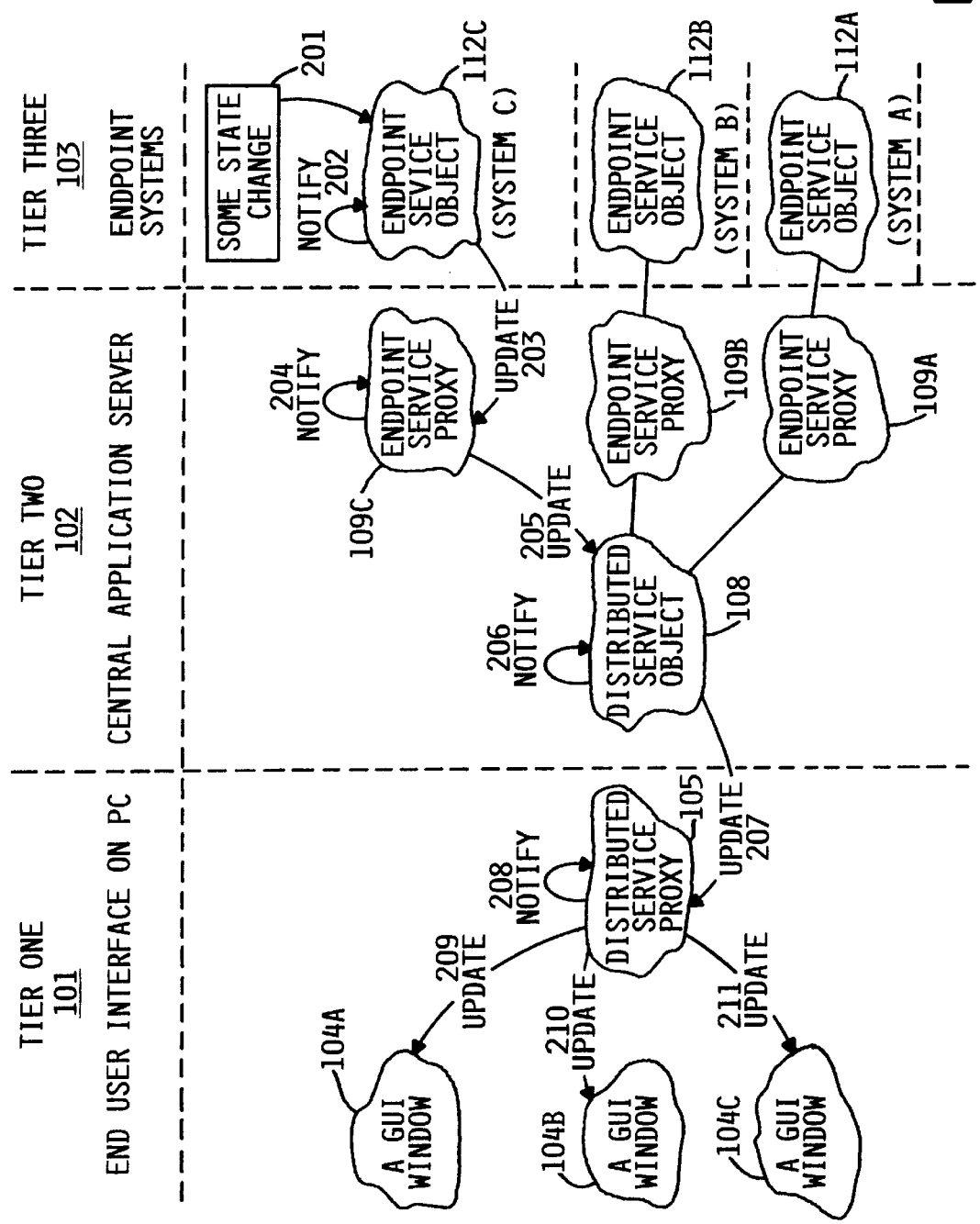
FIG. 2 illustrates a method of notification through a three-tier network started by a state change on an endpoint system, according to an exemplary embodiment of the invention.

FIG. 2 is an object-interact diagram, also referred to as a bubble diagram herein, which illustrates the above described method of notification through a three-tier network started by a state change on an endpoint system. In particular, there are three endpoint systems, SYSTEM A, SYSTEM B, and SYSTEM C, illustrated in tier three 103, for purposes of explanation. In SYSTEM C, some state change occurs at 201 which is detected by endpoint service object 112C.

A notify operation 202 is initiated, and an update is issued 203 to the corresponding endpoint service proxy 109C in tier two 102. A notify operation 204 is initiated and an update is issued 205 to the distributed service object 108.

A notify operation 206 is initiated and an update is issued 207 to the distributed service proxy 105 in tier one 101. A notify operation 208 is initiated and an respective update 209, 210, 211 issued to each affected graphical user interface (GUI) window 104A, 104B, 104C.

Figure 3:
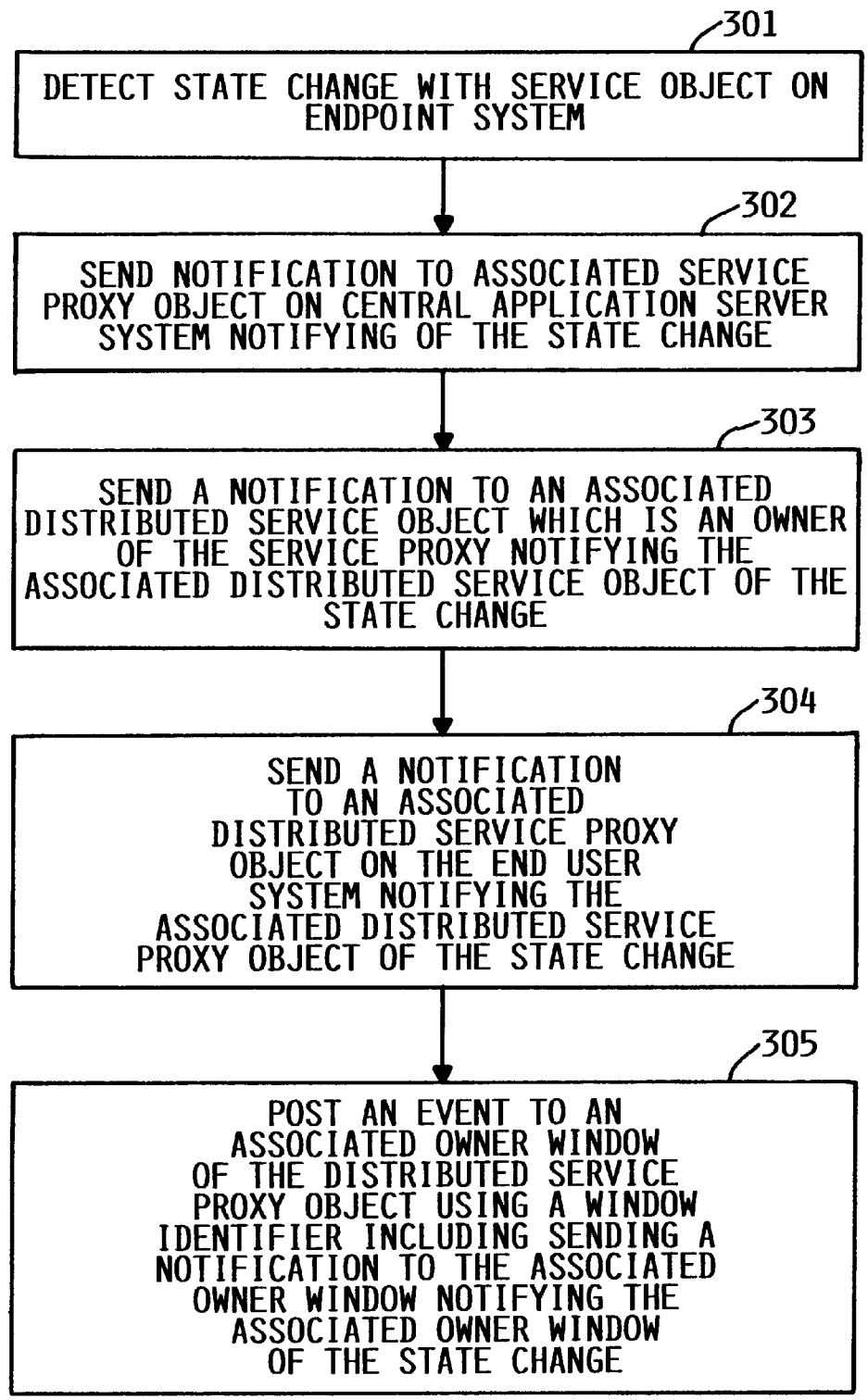
FIG. 3 is a flow chart of an exemplary embodiment of a method according to the invention.

FIG. 3 is a flow chart of an exemplary embodiment of a method for routing asynchronous state changes in a multi-processing system having an end user system, a central application server system and an endpoint system, according to the invention. In block 301, a state change IS detected with a service object on the endpoint system. In block 302, a notification is sent to an associated service proxy object on the central application server system notifying the associated service proxy object of the state change. In block 303, a notification is sent to an associated distributed service object which is an owner of the service proxy notifying the associated distributed service object of the state change. In block 304, a notification is sent to an associated distributed service proxy object on the end user system notifying the associated distributed service proxy object of the state change. In block 305, an event is posted to an associated owner window of the distributed service proxy object using a window identifier. This includes sending a notification to the associated owner window notifying the associated owner window of the state change.

The advantageous solution according to the invention, while described with respect to a three-tiered network environment, is applicable to any N-tiered network application. As one skilled in the art would recognize and appreciate, a solution according to the invention has applicability to virtually any network or multi-processing application. That is, one skilled in the art would understand that the invention is applicable to any number of multi-processing arrangements where state change, e.g., data change, notification is important.

It will be apparent to one skilled in the art that the manner of making and using the claimed invention has been adequately disclosed in the above-written description of the preferred embodiments taken together with the drawings.

It will be understood that the above described preferred embodiments of the present invention are susceptible to various modifications, changes, and adaptations, and the same are intended to be comprehended within the meaning and range of equivalents of the appended claims.

What is claimed is:

1. A method for routing asynchronous state changes in a multi-processing system having an end user system, a central application server system and an endpoint system, the method comprising:

detecting a state change with a service object on the endpoint system;

sending a notification to an associated service proxy object on the central application server system notifying the associated service proxy object of the state change;

sending a notification to an associated distributed service object which is an owner of the service proxy notifying the associated distributed service object of the state change;

sending a notification to an associated distributed service proxy object on the end user system notifying the associated distributed service proxy object of the state change; and posting an event to an associated owner window of the distributed service proxy object using a window identifier including sending a notification to the associated owner window notifying the associated owner window of the state change.

2. The method according to claim 1, wherein the state change includes a data change, and wherein the method further comprises passing changed data from the endpoint system to the associated owner window along with the notifications of the state change.

3. The method according to claim 1, wherein there are a plurality of service proxy objects associated with the service object on the endpoint system which detected the state change, and wherein the method further comprises:

sending a notification to each of the associated service proxy objects on the central application server system notifying the service proxy objects of the state change.

4. The method according to claim 1, wherein there are a plurality of distributed service objects associated with the endpoint service proxy object, and wherein the method further comprises:

sending a notification to each of the associated distributed service objects on the central application server system notifying the associated distributed service objects of the state change.

5. The method according to claim 1, wherein there are a plurality of distributed service proxies associated with the distributed service object, and wherein the method further comprises:

sending a notification to each of the associated distributed service proxies on the end user system notifying the associated distributed service proxies of the state change.

6. The method according to claim 1, wherein there are a plurality of owner windows associated with the distributed service proxy, and wherein the method further comprises:

posting an event to each of the associated owner windows using respective window identifiers, including sending a notification to each of the associated owner windows notifying the associated owner windows of the state change.

7. The method according to claim 6, wherein the state change includes a data change, and wherein the method further comprises passing changed data from the endpoint system to each of the associated owner windows along with the notifications of the state change.

8. The method according to claim 6, wherein there are a plurality of service proxy objects associated with each service object on the endpoint system, and wherein the method further comprises:

sending a notification to each of the associated service proxy objects on the central application server system notifying the service proxy objects of the state change.

9. The method according to claim 8, wherein there are a plurality of distributed service objects associated with each endpoint service proxy object, and wherein the method further comprises:

sending a notification to each of the associated distributed service objects on the central application server system notifying the associated distributed service objects of the state change.

10. The method according to claim 9, wherein there are a plurality of distributed service objects associated with each endpoint service proxy object, and wherein the method further comprises:

sending a notification to each of the associated distributed service objects on the central application server system notifying the associated distributed service objects of the state change.

11. The method according to claim 10, wherein the state change includes a data change, and wherein the method further comprises passing changed data from the endpoint system to each of the associated owner windows along with the notifications of the state change.

12. A multi-processing system for performing the method according to claim 1, wherein the end user system comprises a personal computer, wherein the central application server system comprises a network server, and wherein the endpoint system comprises a remote computer database.

13. The system according to claim 12, wherein the multi-processing system comprises an N-tiered network.

14. The system according to claim 13, wherein the N-tiered network comprises a three-tiered, and wherein the end user system is disposed in a first tier and comprises a plurality of personal computers.

15. The system according to claim 14, wherein the central application server system is disposed in a second tier and comprises a plurality of network servers.

16. The system according to claim 15, wherein the endpoint system is disposed in a third tier and comprises a plurality of remote computer databases.

17. A multi-processing system for performing the method according to claim 2, wherein the end user system comprises a personal computer, wherein the central application server system comprises a network server, and wherein the endpoint system comprises a remote computer database.

18. A multi-processing system for performing the method according to claim 6, wherein the end user system comprises a personal computer, wherein the central application server system comprises a network server, and wherein the endpoint system comprises a remote computer database.

19. A multi-processing system for performing the method according to claim 11, wherein the end user system comprises a personal computer, wherein the central application server system comprises a network server, and wherein the endpoint system comprises a remote computer database.

20. The system according to claim 19, wherein the end user system comprises a plurality of personal computers, wherein the central application server system comprises a plurality of network servers, and wherein the endpoint system comprises a plurality of remote computer databases.

21. In an object-oriented, multi-processing system having N-tiers, a method for routing asynchronous state changes comprising:

detecting a state change with an object in one of the N-tiers; and sending a state change notification from the object in the one tier in which the state change was detected to an associated proxy in another tier affected by the state change.

22. The method according to claim 21, wherein there is a distributed service object on at least one tier of the N-tiered system, the distributed service object having on that tier a plurality of owned service proxies, each owned service proxy having an associated service object on another tier, the method further comprising notifying the distributed service object of a state change which affects a service object associated with a service proxy owned by the distributed service object.

23. A multi-processing system for performing he method according to claim 1, wherein the end user system comprises at least one of a network computer and a personal computer.

* * * * *